United States Patent
Wang et al.

(10) Patent No.: US 11,047,406 B2
(45) Date of Patent: *Jun. 29, 2021

(54) PILOT CONTROL MECHANISM FOR BOOM BOUNCE REDUCTION

(71) Applicant: Eaton Intelligent Power Limited, Dublin (IE)

(72) Inventors: Meng (Rachel) Wang, Eden Prairie, MN (US); Michael Berne Rannow, Eden Prairie, MN (US)

(73) Assignee: Eaton Intelligent Power Limited, Dublin (IE)

( * ) Notice: Subject to any disclaimer, the term of this patent is extended or adjusted under 35 U.S.C. 154(b) by 7 days.

This patent is subject to a terminal disclaimer.

(21) Appl. No.: 16/502,273

(22) Filed: Jul. 3, 2019

(65) Prior Publication Data

US 2020/0032820 A1   Jan. 30, 2020

Related U.S. Application Data

(63) Continuation of application No. 15/036,756, filed as application No. PCT/US2014/064646 on Nov. 7, 2014, now Pat. No. 10,344,783.

(Continued)

(51) Int. Cl.
  *F15B 21/00* (2006.01)
  *E02F 9/22* (2006.01)
  (Continued)

(52) U.S. Cl.
  CPC .......... *F15B 21/008* (2013.01); *B66C 13/066* (2013.01); *E02F 9/226* (2013.01);
  (Continued)

(58) Field of Classification Search
  CPC .... F15B 21/008; F15B 11/0445; F15B 13/01; F15B 2211/30515; B66C 13/066
  See application file for complete search history.

(56) References Cited

U.S. PATENT DOCUMENTS 3,917,246 A    11/1975  Gartner et al.
4,621,375 A    11/1986  Simnovec
(Continued)

FOREIGN PATENT DOCUMENTS

CN    202322251 U    7/2012
CN    102705288 A    10/2012
(Continued)

OTHER PUBLICATIONS

Extended European Search Report for Application No. 14803575.1 dated Dec. 20, 2016.
(Continued)

*Primary Examiner* — Abiy Teka
*Assistant Examiner* — Daniel S Collins
(74) *Attorney, Agent, or Firm* — Merchant & Gould P.C.

(57) ABSTRACT

A hydraulic system (600) and method for reducing boom dynamics of a boom (30), while providing counter-balance valve protection, includes a hydraulic actuator (110), first and second counter-balance valves (300, 400), first and second control valves (700, 800), and first and second blocking valves (350, 450). A net load (90) is supported by a first chamber (116, 118) of the hydraulic actuator, and a second chamber (118, 116) of the hydraulic actuator may receive fluctuating hydraulic fluid flow from the second control valve to produce a vibratory response (950) that counters environmental vibrations (960) on the boom. The first blocking valve prevents the fluctuating hydraulic fluid flow from opening the first counter-balance valve. The first blocking valve may drain leakage from the first counter-balance valve.

15 Claims, 6 Drawing Sheets

Related U.S. Application Data

(60) Provisional application No. 61/904,347, filed on Nov. 14, 2013.

(51) Int. Cl.
| | | |
|---|---|---|
| *F15B 11/00* | (2006.01) | |
| *B66C 13/06* | (2006.01) | |
| *E04G 21/04* | (2006.01) | |
| *F15B 11/044* | (2006.01) | |
| *F16F 15/023* | (2006.01) | |
| *F16F 15/027* | (2006.01) | |

(52) U.S. Cl.
CPC ........ *E02F 9/2207* (2013.01); *E04G 21/0436* (2013.01); *E04G 21/0454* (2013.01); *F15B 11/003* (2013.01); *F15B 11/0445* (2013.01); *F16F 15/023* (2013.01); *F16F 15/027* (2013.01); *F15B 2211/3057* (2013.01); *F15B 2211/30515* (2013.01); *F15B 2211/329* (2013.01); *F15B 2211/5059* (2013.01); *F15B 2211/526* (2013.01); *F15B 2211/6313* (2013.01); *F15B 2211/6658* (2013.01); *F15B 2211/8613* (2013.01); *F15B 2211/8616* (2013.01)

(56) References Cited

U.S. PATENT DOCUMENTS

| | | | |
|---|---|---|---|
| 4,896,582 | A | 1/1990 | Tordenmalm et al. |
| 5,048,296 | A | 9/1991 | Sunamura et al. |
| 5,191,826 | A | 3/1993 | Brunner |
| 5,245,826 | A | 9/1993 | Roth et al. |
| 5,640,996 | A | 6/1997 | Schlecht et al. |
| 5,699,386 | A | 12/1997 | Measor et al. |
| 5,784,944 | A | 7/1998 | Tozawa et al. |
| 5,832,730 | A | 11/1998 | Mizui |
| 5,996,465 | A | 12/1999 | Morikawa et al. |
| 6,202,013 | B1 | 3/2001 | Anderson et al. |
| 6,328,173 | B1 | 12/2001 | Wimmer |
| 6,634,172 | B2 | 10/2003 | Schoonmaker et al. |
| 6,883,532 | B2 | 4/2005 | Rau |
| 7,143,682 | B2 | 12/2006 | Nissing et al. |
| 7,278,262 | B2 | 10/2007 | Moon |
| 7,296,404 | B2 | 11/2007 | Pfaff |
| 7,729,832 | B2 | 6/2010 | Benckert et al. |
| 8,037,682 | B2 | 10/2011 | Yi et al. |
| 8,082,083 | B2 | 12/2011 | Pirri et al. |
| 9,810,242 | B2 | 11/2017 | Wang |
| 9,933,328 | B2 | 4/2018 | Rannow |
| 10,036,407 | B2 | 7/2018 | Rannow et al. |
| 10,316,929 | B2 | 6/2019 | Wang et al. |
| 10,323,663 | B2 | 6/2019 | Wang et al. |
| 10,344,783 | B2 * | 7/2019 | Wang ................... F15B 11/003 |
| 2002/0092417 | A1 | 7/2002 | Suzuki et al. |
| 2003/0159576 | A1 | 8/2003 | Schoonmaker et al. |
| 2006/0272325 | A1 | 12/2006 | Moon |
| 2010/0186401 | A1 | 7/2010 | Kauss et al. |
| 2011/0088785 | A1 | 4/2011 | Balasubramania |
| 2011/0179783 | A1 | 7/2011 | Pirri et al. |
| 2012/0198832 | A1 | 8/2012 | Fukumoto |
| 2016/0108936 | A1 | 4/2016 | Wang |
| 2016/0222989 | A1 | 8/2016 | Rannow et al. |
| 2016/0298660 | A1 | 10/2016 | Wang et al. |
| 2016/0298719 | A1 | 10/2016 | Wang et al. |
| 2017/0204886 | A1 | 7/2017 | Wang et al. |
| 2018/0156243 | A1 | 6/2018 | Wang |
| 2019/0101137 | A1 | 4/2019 | Rannow et al. |

FOREIGN PATENT DOCUMENTS

| | | |
|---|---|---|
| DE | 102 53 871 B3 | 8/2004 |
| DE | 20 2009 007 668 U1 | 10/2009 |
| EP | 0 457 913 A1 | 11/1991 |
| EP | 1 134 431 B1 | 5/2005 |
| EP | 2 347 988 A1 | 7/2011 |
| EP | 2 503 161 A2 | 9/2012 |
| JP | H05-163746 A | 6/1993 |
| JP | 6-147259 A | 5/1994 |
| JP | 7-113436 A | 5/1995 |
| JP | 7-300881 A | 11/1995 |
| JP | 9-041428 A | 2/1997 |
| JP | 3079498 B2 | 8/2000 |
| JP | 2003-20197 A | 1/2003 |
| JP | 2004-301214 A | 10/2004 |
| JP | 2004-308746 A | 11/2004 |
| JP | 2006-300280 A | 11/2006 |
| JP | 2009-74692 A | 4/2009 |
| JP | 2012-197937 A | 10/2012 |
| JP | 2013-35527 A | 2/2013 |
| KR | 10-1190553 B1 | 10/2012 |
| WO | 2014/193649 A1 | 12/2014 |
| WO | 2015/031821 A1 | 3/2015 |
| WO | 2015/073330 A1 | 5/2015 |
| WO | 2015/191661 A1 | 5/2015 |
| WO | 2016/011193 A1 | 12/2015 |

OTHER PUBLICATIONS

Extended European Search Report for corresponding European Patent Application No. 14840792.7 dated May 9, 2017, 5 pages.
Extended European Search Report for Application No. 14862808.4 dated May 17, 2017.
Extended European Search Report for Application No. 14861695.6 dated Jun. 23, 2017.
Extended European Search Report for corresponding European Patent Application No. 15822402.2 dated Mar. 6, 2018, 8 pages.
Honma, K. et al., "Vibration Damping Control for Construction Machinery with a Long Arm Manipulator," Journal of the Robotics Society of Japan (JRSJ), vol. 6, No. 5, pp. 99-102 (Oct. 1988).
International Search Report for corresponding International Patent Application No. PCT/US2014/037879 dated Sep. 22, 2014.
International Search Report for corresponding International Patent Application No. PCT/US2014/053523 dated Dec. 3, 2014.
International Search Report for corresponding International Patent Application No. PCT/US2014/064646 dated Mar. 12, 2015.
International Search Report for corresponding International Patent Application No. PCT/US2014/064651 dated Feb. 16, 2015.
International Search Report and Written Opinion of the International Searching Authority for corresponding International Patent Application No. PCT/US2015/040636 dated Oct. 15, 2015, 8 pgs.
Ultronics ZTS16 Control Architecture Overview, Version 1.3, 18 pages (Jul. 2010).
Ultronics ZTS16 User Manual V1.0 (for SW Version 2.3 & OD Version 2.2, 52 pages (Nov. 25, 2009).

* cited by examiner

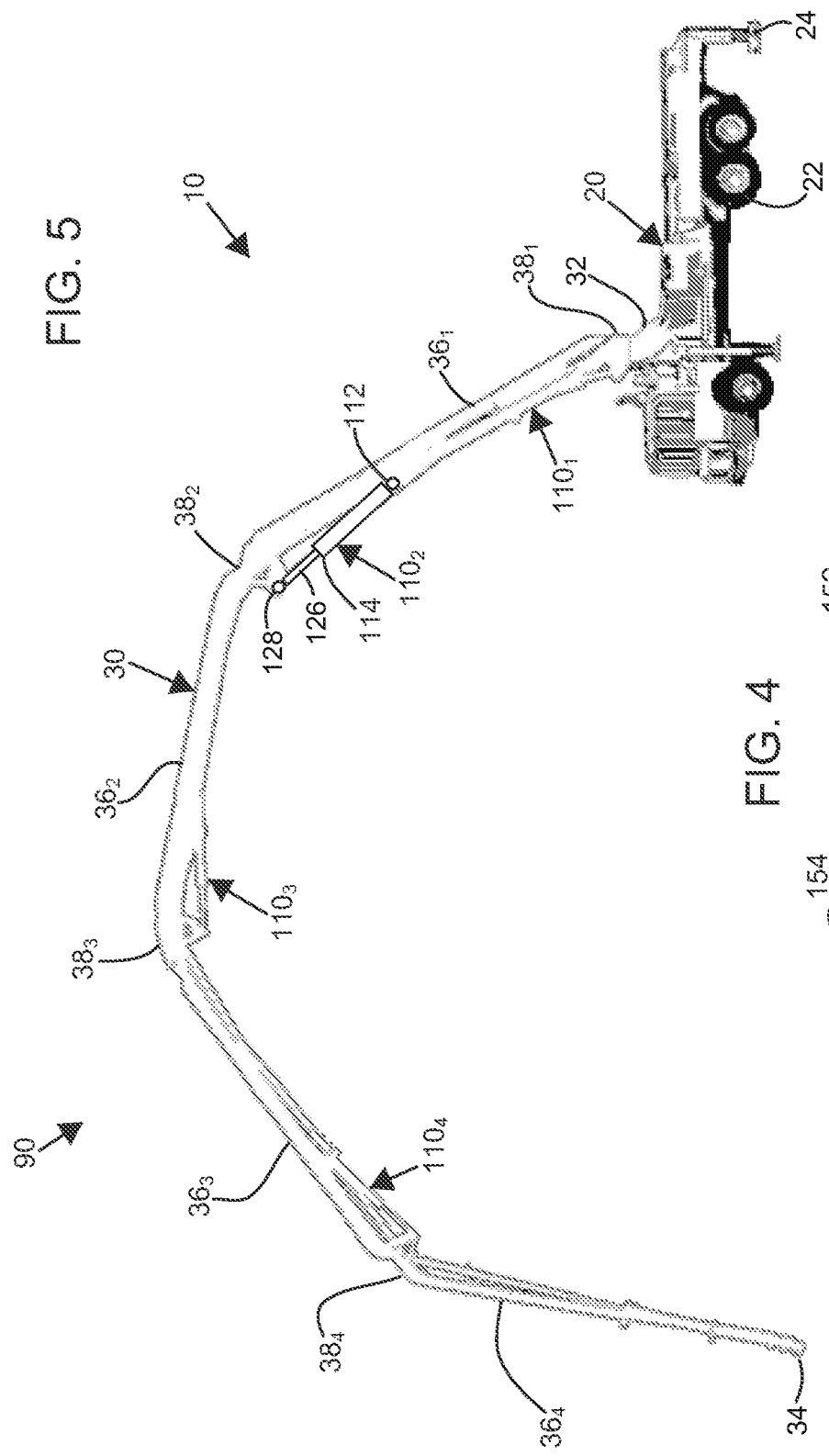
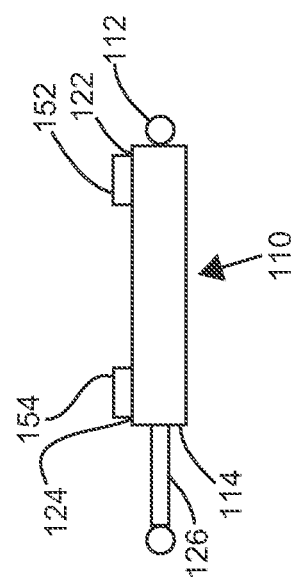

PILOT CONTROL MECHANISM FOR BOOM BOUNCE REDUCTION

CROSS-REFERENCE TO RELATED APPLICATION(S)

This application is a Continuation of U.S. patent application Ser. No. 15/036,756, filed on May 13, 2016, now U.S. Pat. No. 10,344,783, which is a National Stage Application of PCT/US2014/064646 filed on Nov. 7, 2014, which claims benefit of U.S. Patent Application Ser. No. 61/904,347 filed on Nov. 14, 2013, and which applications are incorporated herein by reference. To the extent appropriate, a claim of priority is made to each of the above disclosed applications.

BACKGROUND

Various off-road and on-road vehicles include booms. For example, certain concrete pump trucks include a boom configured to support a passage through which concrete is pumped from a base of the concrete pump truck to a location at a construction site where the concrete is needed. Such booms may be long and slender to facilitate pumping the concrete a substantial distance away from the concrete pump truck. In addition, such booms may be relatively heavy. The combination of the substantial length and mass properties of the boom may lead to the boom exhibiting undesirable dynamic behavior. In certain booms in certain configurations, a natural frequency of the boom may be about 0.3 Hertz (i.e., 3.3 seconds per cycle). In certain booms in certain configurations, the natural frequency of the boom may be less than about 1 Hertz (i.e., 1 second per cycle). In certain booms in certain configurations, the natural frequency of the boom may range from about 0.1 Hertz to about 1 Hertz (i.e., 10 seconds per cycle to 1 second per cycle). For example, as the boom is moved from place to place, the starting and stopping loads that actuate the boom may induce vibration (i.e., oscillation). Other load sources that may excite the boom include momentum of the concrete as it is pumped along the boom, starting and stopping the pumping of concrete along the boom, wind loads that may develop against the boom, and/or other miscellaneous loads.

Other vehicles with booms include fire trucks in which a ladder may be included on the boom, fire trucks which include a boom with plumbing to deliver water to a desired location, excavators which use a boom to move a shovel, tele-handlers which use a boom to deliver materials around a construction site, cranes which may use a boom to move material from place-to-place, etc.

In certain boom applications, including those mentioned above, a hydraulic cylinder may be used to actuate the boom. By actuating the hydraulic cylinder, the boom may be deployed and retracted, as desired, to achieve a desired placement of the boom. In certain applications, counter-balance valves may be used to control actuation of the hydraulic cylinder and/or to prevent the hydraulic cylinder from uncommanded movement (e.g., caused by a component failure). A prior art system 100, including a first counter-balance valve 300 and a second counter-balance valve 400 is illustrated at FIG. 1. The counter-balance valve 300 controls and/or transfers hydraulic fluid flow into and out of a first chamber 116 of a hydraulic cylinder 110 of the system 100. Likewise, the second counter-balance valve 400 controls and/or transfers hydraulic fluid flow into and out of a second chamber 118 of the hydraulic cylinder 110. In particular, a port 302 of the counter-balance valve 300 is connected to a port 122 of the hydraulic cylinder 110. Likewise, a port 402 of the counter-balance valve 400 is fluidly connected to a port 124 of the hydraulic cylinder 110. As depicted, a fluid line 522 schematically connects the port 302 to the port 122, and a fluid line 524 connects the port 402 to the port 124. The counter-balance valves 300, 400 are typically mounted directly to the hydraulic cylinder 110. The port 302 may directly connect to the port 122, and the port 402 may directly connect to the port 124.

The counter-balance valves 300, 400 provide safety protection to the system 100. In particular, before movement of the cylinder 110 can occur, hydraulic pressure must be applied to both of the counter-balance valves 300, 400. The hydraulic pressure applied to one of the counter-balance valves 300, 400 is delivered to a corresponding one of the ports 122, 124 of the hydraulic cylinder 110 thereby urging a piston 120 of the hydraulic cylinder 110 to move. The hydraulic pressure applied to an opposite one of the counter-balance valves 400, 300 allows hydraulic fluid to flow out of the opposite port 124, 122 of the hydraulic cylinder 110. By requiring hydraulic pressure at the counter-balance valve 300, 400 corresponding to the port 122, 124 that is releasing the hydraulic fluid, a failure of a hydraulic line, a valve, a pump, etc. that supplies or receives the hydraulic fluid from the hydraulic cylinder 110 will not result in uncommanded movement of the hydraulic cylinder 110.

Turning now to FIG. 1, the system 100 will be described in detail. As depicted, a four-way three position hydraulic control valve 200 is used to control the hydraulic cylinder 110. The control valve 200 includes a spool 220 that may be positioned at a first configuration 222, a second configuration 224, or a third configuration 226. As depicted at FIG. 1, the spool 220 is at the first configuration 222. In the first configuration 222, hydraulic fluid from a supply line 502 is transferred from a port 212 of the control valve 200 to a port 202 of the control valve 200 and ultimately to the port 122 and the chamber 116 of the hydraulic cylinder 110. The hydraulic cylinder 110 is thereby urged to extend and hydraulic fluid in the chamber 118 of the hydraulic cylinder 110 is urged out of the port 124 of the cylinder 110. Hydraulic fluid leaving the port 124 returns to a hydraulic tank by entering a port 204 of the control valve 200 and exiting a port 214 of the control valve 200 into a return line 504. In certain embodiments, the supply line 502 supplies hydraulic fluid at a constant or at a near constant supply pressure. In certain embodiments, the return line 504 receives hydraulic fluid at a constant or at a near constant return pressure.

When the spool 220 is positioned at the second configuration 224, hydraulic fluid flow between the port 202 and the ports 212, 214 and hydraulic fluid flow between the port 204 and the ports 212, 214 are effectively stopped, and hydraulic fluid flow to and from the cylinder 110 is effectively stopped. Thus, the hydraulic cylinder 110 remains substantially stationary when the spool 220 is positioned at the second configuration 224.

When the spool 220 is positioned at the third configuration 226, hydraulic fluid flow from the supply line 502 enters through the port 212 and exits through the port 204 of the valve 200. The hydraulic fluid flow is ultimately delivered to the port 124 and the chamber 118 of the hydraulic cylinder 110 thereby urging retraction of the cylinder 110. As hydraulic fluid pressure is applied to the chamber 118, hydraulic fluid within the chamber 116 is urged to exit through the port 122. Hydraulic fluid exiting the port 122 enters the port 202 and exits the port 214 of the valve 200 and thereby returns to the hydraulic tank. An operator and/or a control system may move the spool 220 as desired and thereby achieve extension, retraction, and/or locking of the hydraulic cylinder 110.

A function of the counter-balance valves 300, 400 when the hydraulic cylinder 110 is extending will now be discussed in detail. Upon the spool 220 of the valve 200 being placed in the first configuration 222, hydraulic fluid pressure from the supply line 502 pressurizes a hydraulic line 512. The hydraulic line 512 is connected between the port 202 of the control valve 200, a port 304 of the counter-balance valve 300, and a port 406 of the counter-balance valve 400. Hydraulic fluid pressure applied at the port 304 of the counter-balance valve 300 flows past a spool 310 of the counter-balance valve 300 and past a check valve 320 of the counter-balance valve 300 and thereby flows from the port 304 to the port 302 through a passage 322 of the counter-balance valve 300. The hydraulic fluid pressure further flows through the port 122 and into the chamber 116 (i.e., a meter-in chamber). Pressure applied to the port 406 of the counter-balance valve 400 moves a spool 410 of the counter-balance valve 400 against a spring 412 and thereby compresses the spring 412. Hydraulic fluid pressure applied at the port 406 thereby opens a passage 424 between the port 402 and the port 404. By applying hydraulic pressure at the port 406 (i.e., a pilot), hydraulic fluid may exit the chamber 118 (i.e., a meter-out chamber) through the port 124, through the line 524, through the passage 424 of the counter-balance valve 400 across the spool 410, through a hydraulic line 514, through the valve 200, and through the return line 504 into the tank. The meter-out side may supply backpressure.

A function of the counter-balance valves 300, 400 when the hydraulic cylinder 110 is retracting will now be discussed in detail. Upon the spool 220 of the valve 200 being placed in the third configuration 226, hydraulic fluid pressure from the supply line 502 pressurizes the hydraulic line 514. The hydraulic line 514 is connected between the port 204 of the control valve 200, a port 404 of the counter-balance valve 400, and a port 306 of the counter-balance valve 300. Hydraulic fluid pressure applied at the port 404 of the counter-balance valve 400 flows past the spool 410 of the counter-balance valve 400 and past a check valve 420 of the counter-balance valve 400 and thereby flows from the port 404 to the port 402 through a passage 422 of the counter-balance valve 400. The hydraulic fluid pressure further flows through the port 124 and into the chamber 118 (i.e., a meter-in chamber). Hydraulic pressure applied to the port 306 of the counter-balance valve 300 moves the spool 310 of the counter-balance valve 300 against a spring 312 and thereby compresses the spring 312. Hydraulic fluid pressure applied at the port 306 thereby opens a passage 324 between the port 302 and the port 304. By applying hydraulic pressure at the port 306 (i.e., a pilot), hydraulic fluid may exit the chamber 116 (i.e., a meter-out chamber) through the port 122, through the line 522, through the passage 324 of the counter-balance valve 300 across the spool 310, through the hydraulic line 512, through the valve 200, and through the return line 504 into the tank. The meter-out side may supply backpressure.

The supply line 502, the return line 504, the hydraulic line 512, the hydraulic line 514, the hydraulic line 522, and/or the hydraulic line 524 may belong to a line set 500.

Conventional solutions for reducing the above mentioned oscillations are typically passive (i.e., orifices) which are tuned for one particular operating point and often have a negative impact on efficiency. Many machines/vehicles with extended booms employ counter-balance valves (CBVs) such as counter-balance valves 300, 400 for safety and safety regulation reasons. These counter-balance valves (CBVs) restrict/block the ability of the hydraulic control valve (e.g., the hydraulic control valve 200) to sense and act upon pressure oscillations. In certain applications, such as concrete pump truck booms, oscillations are induced by external sources (e.g., the pumping of the concrete) when the machine (e.g., the boom) is nominally stationary. In this case, the counter-balance valves (CBVs) are closed, and the main control valve (e.g., the hydraulic control valve 200) is isolated from the oscillating pressure that is induced by the oscillations. There are a number of conventional solutions that approach this problem, that typically rely on joint position sensors to sense the oscillations (i.e., ripples) and prevent drift due to flow through a ripple-cancelling valve. Some solutions also have parallel hydraulic systems that allow a ripple-cancelling valve to operate while the counter-balance valves (CBVs) are in place.

SUMMARY

One aspect of the present disclosure relates to systems and methods for reducing boom dynamics (e.g., boom bounce) of a boom while providing counter-balance valve protection to the boom.

Another aspect of the present disclosure relates to a hydraulic system including a hydraulic cylinder, a first counter-balance valve, a second counter-balance valve, a first control valve, a second control valve, and a first valve. The hydraulic cylinder includes a first chamber and a second chamber. The first counter-balance valve fluidly connects to the first chamber at a first node. The second counter-balance valve fluidly connects to the second chamber at a second node. The first control valve fluidly connects to the first counter-balance valve at a third node. The second control valve fluidly connects to the second counter-balance valve at a fourth node. The first valve fluidly connects to a pilot of the first counter-balance valve at a fifth node and fluidly connects to the second counter-balance valve and the second control valve at the fourth node. In certain embodiments, the hydraulic system further includes a second valve that is fluidly connected to a pilot of the second counter-balance valve at a sixth node and is fluidly connected to the first counter-balance valve and the first control valve at the third node.

In certain embodiments, the first chamber is a rod chamber, and the second chamber is a head chamber. In other embodiments, the first chamber is a head chamber, and the second chamber is a rod chamber. In certain embodiments, the first counter-balance valve and the second counter-balance valve are physically mounted to the hydraulic cylinder.

Still another aspect of the present disclosure relates to a method of controlling vibration in a boom. The method includes providing a hydraulic actuator, providing a valve arrangement, providing a valve, identifying a loaded chamber, locking a corresponding one of a pair of counter-balance valves that corresponds to the loaded chamber, transmitting vibrating hydraulic fluid, and preventing transmission of the vibrating hydraulic fluid. The hydraulic actuator includes a pair of chambers. The valve arrangement includes the pair of counter-balance valves. The pair of counter-balance valves corresponds to the pair of chambers. The valve arrangement further includes a pair of control valves that corresponds to the pair of chambers. The valve includes a first configuration that is adapted to selectively fluidly connect one of the pair of counter-balance valves to an opposite one of the pair of control valves and also includes a second configuration that is adapted to selectively fluidly disconnect the one of the pair of counter-balance valves from the opposite one of the pair of control valves. The loaded chamber is identified from the pair of chambers of the hydraulic actuator. The vibrating hydraulic fluid is transmitted from a corresponding one of the pair of control valves that corresponds to an unloaded chamber of the pair of chambers. The vibrating hydraulic fluid is prevented from transmitting from the corresponding one of the pair of control valves to the one of the pair of counter-balance valves by setting the valve at the second configuration.

In certain embodiments, the method further includes draining leakage from the one of the pair of counter-balance valves through the valve.

A variety of additional aspects will be set forth in the description that follows. These aspects can relate to individual features and to combinations of features. It is to be understood that both the foregoing general description and the following detailed description are exemplary and explanatory only and are not restrictive of the broad concepts upon which the embodiments disclosed herein are based.

BRIEF DESCRIPTION OF THE DRAWINGS

FIG. 4 is a schematic illustration of a hydraulic cylinder suitable for use with the hydraulic cylinder control system of FIG. 2 according to the principles of the present disclosure;

FIG. 5 is a schematic illustration of a vehicle with a boom system that is actuated by one or more cylinders and controlled with the hydraulic system of FIG. 2 according to the principles of the present disclosure;

DETAILED DESCRIPTION

Figure 1:
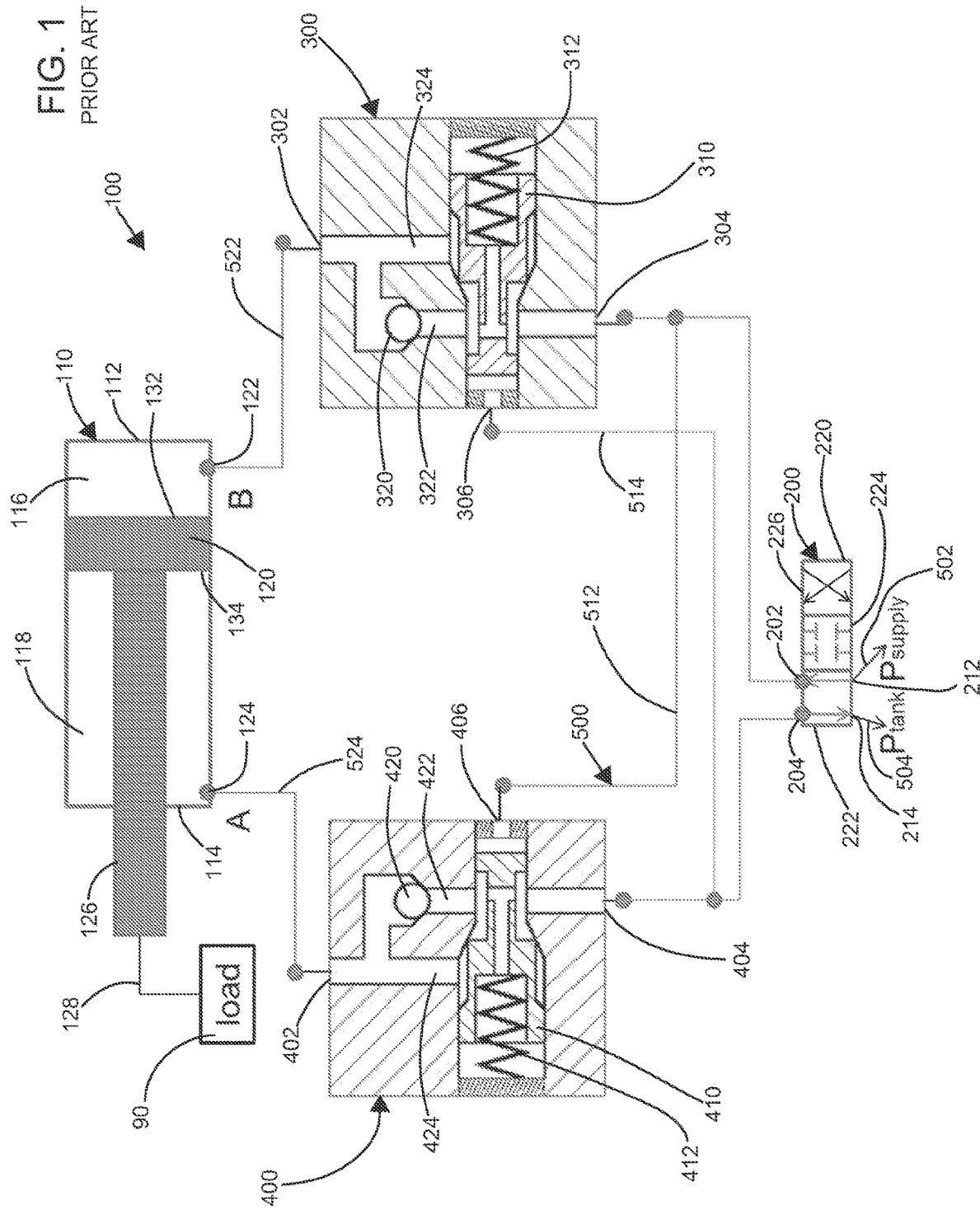
FIG. 1 is a schematic illustration of a prior art hydraulic system including a hydraulic cylinder with a pair of counter-balance valves and a control valve.
Figure 2:
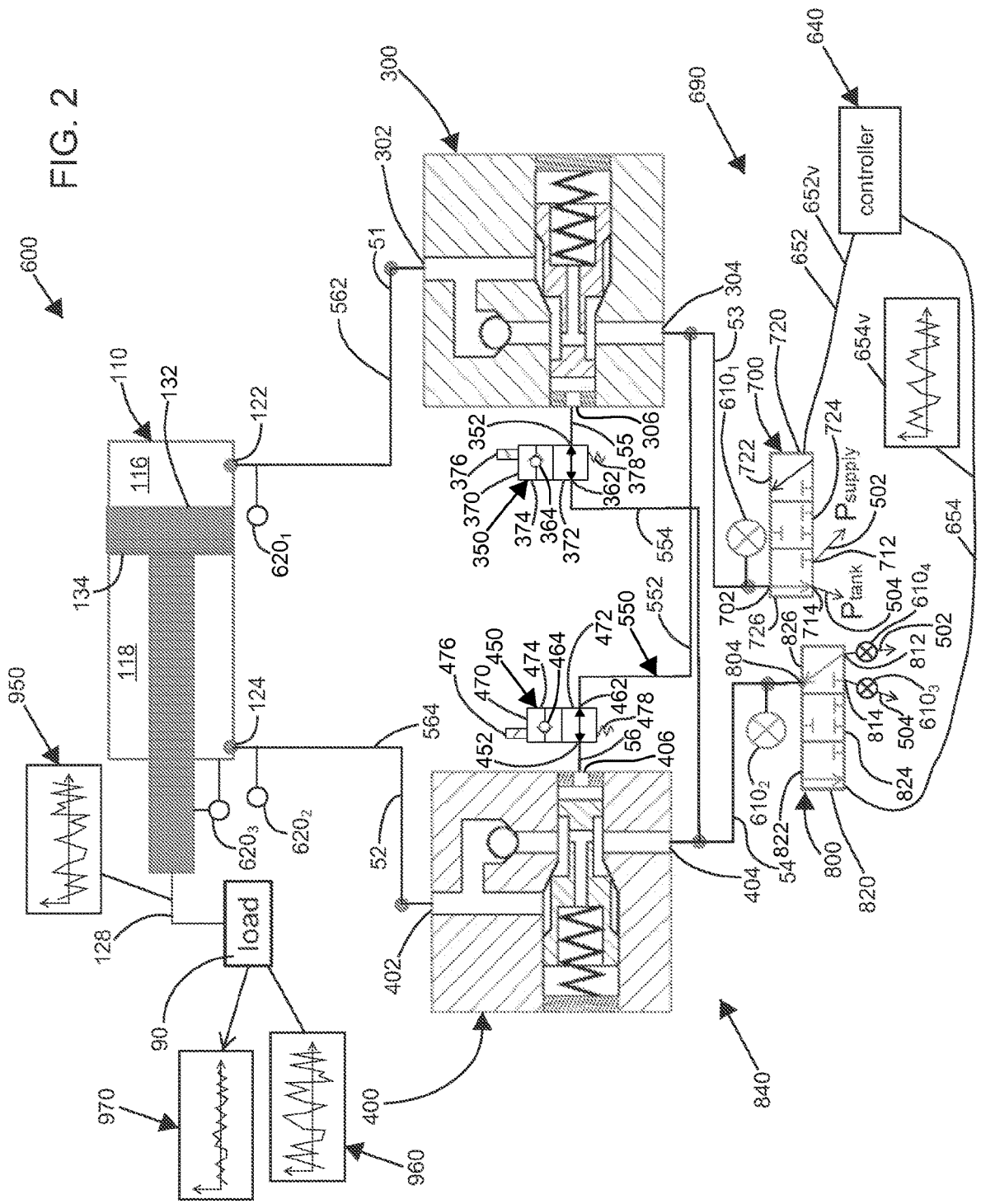
FIG. 2 is a schematic illustration of a hydraulic system including the hydraulic cylinder and the counter-balance valves of FIG. 1 configured with a hydraulic cylinder control system according to the principles of the present disclosure.

According to the principles of the present disclosure, a hydraulic system is adapted to actuate the hydraulic cylinder 110, including the counter-balance valves 300 and 400, and further provides means for counteracting vibrations to which the hydraulic cylinder 110 is exposed. As illustrated at FIG. 2, an example system 600 is illustrated with the hydraulic cylinder 110 (i.e., a hydraulic actuator), the counter-balance valve 300, and the counter-balance valve 400. The hydraulic cylinder 110 and the counter-balance valves 300, 400 of FIG. 2 may be the same as those shown in the prior art system 100 of FIG. 1. The hydraulic system 600 may therefore be retrofitted to an existing and/or a conventional hydraulic system. The depicted embodiment illustrated at FIG. 2 can represent the prior art hydraulic system 100 of FIG. 1 retrofitted by replacing the hydraulic control valve 200 with a valve assembly 690, described in detail below, and by adding valves 350 and/or 450. Certain features of the hydraulic cylinder 110 and the counter-balance valves 300, 400 may be the same or similar between the hydraulic system 600 and the prior art hydraulic system 100. These same or similar components and/or features will not, in general, be redundantly re-described herein.

Figure 7:
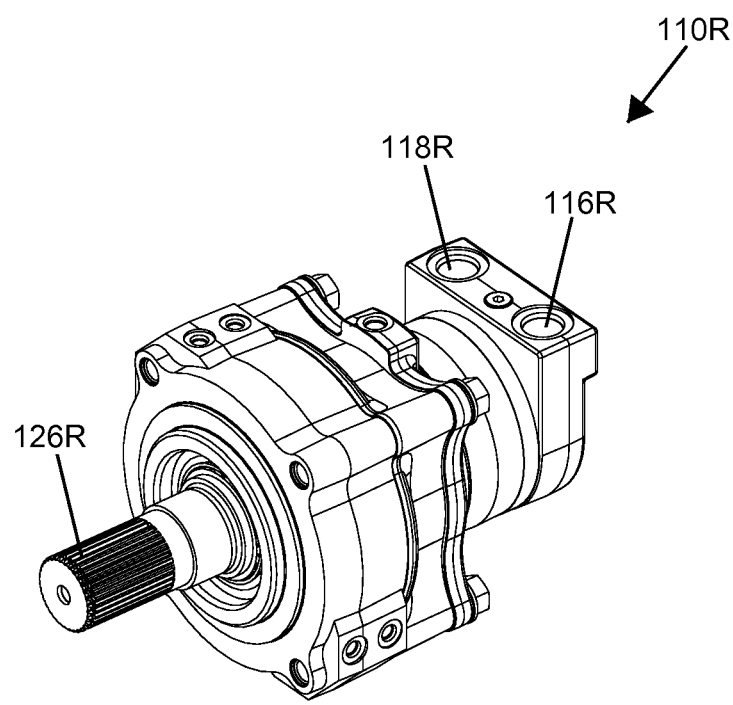
FIG. 7 is a rotary actuator suitable for use with the hydraulic system of FIG. 2 according to the principles of the present disclosure.

It will be understood that certain concepts and principles disclosed herein apply to both linear and rotary actuators. The hydraulic cylinder 110, illustrated in the Figures, is an example actuator. The hydraulic cylinder 110 is an example hydraulic cylinder and an example linear actuator. In certain applications, the hydraulic cylinder 110 may be replaced with a rotary actuator 110R (see FIG. 7). The rotary actuator 110R may operate over a range of less than 360 degrees, a range of 360 degrees, a range of more than 360 degrees, or may have an unlimited range in one or both rotational directions.

According to the principles of the present disclosure, similar protection is provided by the counter-balance valves 300, 400 for the hydraulic cylinder 110 and the hydraulic system 600, as described above with respect to the hydraulic system 100. In particular, failure of a hydraulic line, a hydraulic valve, and/or a hydraulic pump will not lead to an uncommanded movement of the hydraulic cylinder 110 of the hydraulic system 600. The hydraulic architecture of the hydraulic system 600 further provides the ability to counteract vibrations using the hydraulic cylinder 110.

The hydraulic cylinder 110 may hold a net load 90 that, in general, may urge retraction or extension of a rod 126 of the cylinder 110. Alternatively, the rotary hydraulic actuator 110R may hold a net load that, in general, may urge a first rotation or a second rotation of a shaft 126R of the rotary hydraulic actuator 110R (see FIG. 7). The rod 126 is connected to the piston 120 of the cylinder 110. If the load 90 urges extension of the hydraulic cylinder 110, the chamber 118 on a rod side 114 of the hydraulic cylinder 110 is pressurized by the load 90, and the counter-balance valve 400 acts to prevent the release of hydraulic fluid from the chamber 118 and thereby acts as a safety device to prevent uncommanded extension of the hydraulic cylinder 110. In other words, the counter-balance valve 400 locks the chamber 118. In addition to providing safety, the locking of the chamber 118 prevents drifting of the cylinder 110. Alternatively, the counter-balance valve 400 may act to prevent the release of hydraulic fluid from a chamber 118R of the rotary hydraulic actuator 110R and thereby act as a safety device to prevent uncommanded rotation of the rotary hydraulic actuator 110R. Vibration control may be provided via the hydraulic cylinder 110 by dynamically pressurizing and depressurizing the chamber 116 on a head side 112 of the hydraulic cylinder 110. As the hydraulic cylinder 110, the structure to which the hydraulic cylinder 110 is attached, and the hydraulic fluid within the chamber 118 are at least slightly deformable, selective application of hydraulic pressure to the chamber 116 will cause movement (e.g., slight movement) of the hydraulic cylinder 110. Such movement, when timed in conjunction with a system model and/or dynamic measurements of the system, may be used to counteract vibrations of the system 600.

If the load 90 urges retraction of the hydraulic cylinder 110, the chamber 116 on the head side 112 of the hydraulic cylinder 110 is pressurized by the load 90, and the counter-balance valve 300 acts to prevent the release of hydraulic fluid from the chamber 116 and thereby acts as a safety device to prevent uncommanded retraction of the hydraulic cylinder 110. In other words, the counter-balance valve 300 locks the chamber 116. In addition to providing safety, the locking of the chamber 116 prevents drifting of the cylinder 110. Alternatively, the counter-balance valve 300 may act to prevent the release of hydraulic fluid from a chamber 116R of the rotary hydraulic actuator 110R and thereby act as a safety device to prevent uncommanded rotation of the rotary hydraulic actuator 110R. Vibration control may be provided via the hydraulic cylinder 110 by dynamically pressurizing and depressurizing the chamber 118 on the rod side 114 of the hydraulic cylinder 110. As the hydraulic cylinder 110, the structure to which the hydraulic cylinder 110 is attached, and the hydraulic fluid within the chamber 116 are at least slightly deformable, selective application of hydraulic pressure to the chamber 118 will cause movement (e.g., slight movement) of the hydraulic cylinder 110. Such movement, when timed in conjunction with the system model and/or dynamic measurements of the system, may be used to counteract vibrations of the system 600.

The load 90 is depicted as attached via a rod connection 128 to the rod 126 of the cylinder 110. In certain embodiments, the load 90 is a tensile or a compressive load across the rod connection 128 and the head side 112 of the cylinder 110.

As is further described below, the system 600 provides a control framework and a control mechanism to achieve boom vibration reduction for both off-highway vehicles and on-highway vehicles. The vibration reduction may be adapted to reduced vibrations in booms with relatively low natural frequencies (e.g., the concrete pump truck boom). The hydraulic system 600 may also be applied to booms with relatively high natural frequencies (e.g., an excavator boom). Compared with conventional solutions, the hydraulic system 600 may achieve vibration reduction of booms with fewer sensors and a simplified control structure. The vibration reduction method may be implemented while assuring protection from failures of certain hydraulic lines, hydraulic valves, and/or hydraulic pumps, as described above. The protection from failure may be automatic and/or mechanical. In certain embodiments, the protection from failure may not require any electrical signal and/or electrical power to engage. The protection from failure may be and/or meet a regulatory requirement (e.g., an ISO standard). The regulatory requirement may require certain mechanical means of protection that is provided by the hydraulic system 600.

Certain booms may include stiffness and inertial properties that can transmit and/or amplify dynamic behavior of the load 90. As the dynamic load 90 may include external force/position disturbances that are applied to the boom, severe vibrations (i.e., oscillations) may result, especially when these disturbances are near the natural frequency of the boom. Such excitation of the boom by the load 90 may result in safety issues and/or decrease productivity and/or reliability of the boom system. By measuring parameters of the hydraulic system 600 and responding appropriately, effects of the disturbances may be reduced and/or minimized or even eliminated. The response provided may be effective over a wide variety of operating conditions. According to the principles of the present disclosure, vibration control may be achieved using minimal numbers of sensors.

According to the principles of the present disclosure, hydraulic fluid flow to the chamber 116 of the head side 112 of the cylinder 110, and hydraulic fluid flow to the chamber 118 of the rod side 114 of the cylinder 110 are independently controlled and/or metered to realize boom vibration reduction and also to prevent the cylinder 110 from drifting. According to the principles of the present disclosure, the hydraulic system 600 may be configured similar to a conventional counter-balance system (e.g., the hydraulic system 100).

In certain embodiments, the hydraulic system 600 is configured to the conventional counter-balance configuration when a movement of the cylinder 110 is commanded. As further described below, the hydraulic system 600 may enable measurement of pressures within the chambers 116 and/or 118 of the cylinder 110 at a remote location away from the hydraulic cylinder 110 (e.g., at sensors 610). This architecture thereby may reduce mass that would otherwise be positioned on the boom and/or may simplify routing of hydraulic lines (e.g., hard tubing and hoses). Performance of machines such as concrete pump booms and/or lift handlers may be improved by such simplified hydraulic line routing and/or reduced mass on the boom. In certain embodiments, the hydraulic system 600 may enable measurement of the pressures within the chambers 116 and/or 118 of the cylinder 110 at the hydraulic cylinder 110 (e.g., at sensors $620_1$ and/or $620_2$). In the embodiment depicted at FIG. 2, the sensor $620_1$ may measure the pressure within the chamber 116, and the sensor $620_2$ may measure the pressure within the chamber 118. Signals from some or all of the sensors 610, 620 may be sent to a controller 640 (e.g., for use as feedback signals).

The counter-balance valves 300 and 400 may be components of a valve arrangement 840 (i.e., a valve set). The valve arrangement 840 may include various hydraulic components that control and/or regulate hydraulic fluid flow to and/or from the hydraulic cylinder 110. The valve arrangement 840 may further include a control valve 700 (e.g., a proportional hydraulic valve), a control valve 800 (e.g., a proportional hydraulic valve), the valve 350 (e.g., a 2-way valve), and the valve 450 (e.g., a 2-way valve). The control valves 700 and/or 800 may be high bandwidth and/or high resolution control valves.

In the depicted embodiment of FIG. 2, a node 51 is defined at the port 302 of the counter-balance valve 300 and the port 122 of the hydraulic cylinder 110; a node 52 is defined at the port 402 of the counter-balance valve 400 and the port 124 of the hydraulic cylinder 110; a node 53 is defined at the port 304 of the counter-balance valve 300, a port 462 of the valve 450, and the port 702 of the hydraulic valve 700; a node 54 is defined at the port 404 of the counter-balance valve 400, a port 362 of the valve 350, and the port 804 of the hydraulic valve 800; a node 55 is defined at the port 306 of the counter-balance valve 300 and a port 352 of the valve 350; and a node 56 is defined at the port 406 of the counter-balance valve 400 and a port 452 of the valve 450. The hydraulic valves 350 and 450 are described in detail below.

Turning now to FIG. 4, the hydraulic cylinder 110 is illustrated with valve blocks 152, 154. The valve blocks 152, 154 may be separate from each other, as illustrated, or may be a single combined valve block. The valve block 152 may be mounted to and/or over the port 122 of the hydraulic cylinder 110, and the valve block 154 may be mounted to and/or over the port 124 of the hydraulic cylinder 110. The valve blocks 152, 154 may be directly mounted to the hydraulic cylinder 110. The valve block 152 may include the counter-balance valve 300 and/or the valve 350, and the valve block 154 may include the counter-balance valve 400 and/or the valve 450. The valve blocks 152 and/or 154 may include additional components of the valve arrangement 840. The valve blocks 152, 154, and/or the single combined valve block may include sensors and/or sensor ports (e.g., pressure and/or flow sensors and/or corresponding ports).

Turning now to FIG. 5, an example boom system 10 is described and illustrated in detail. The boom system 10 may include a vehicle 20 and a boom 30. The vehicle 20 may include a drive train 22 (e.g., including wheels and/or tracks). As depicted at FIG. 5, rigid retractable supports 24 are further provided on the vehicle 20. The rigid supports 24 may include feet that are extended to contact the ground and thereby support and/or stabilize the vehicle 20 by bypassing ground support away from the drive train 22 and/or suspension of the vehicle 20. In other vehicles (e.g., vehicles with tracks, vehicles with no suspension), the drive train 22 may be sufficiently rigid and retractable rigid supports 24 may not be needed and/or provided.

As depicted at FIG. 5, the boom 30 extends from a first end 32 to a second end 34. As depicted, the first end 32 is rotatably attached (e.g., by a turntable) to the vehicle 20. The second end 34 may be positioned by actuation of the boom 30 and thereby be positioned as desired. In certain applications, it may be desired to extend the second end 34 a substantial distance away from the vehicle 20 in a primarily horizontal direction. In other embodiments, it may be desired to position the second end 34 vertically above the vehicle 20 a substantial distance. In still other applications, the second end 34 of the boom 30 may be spaced both vertically and horizontally from the vehicle 20. In certain applications, the second end 34 of the boom 30 may be lowered into a hole and thereby be positioned at an elevation below the vehicle 20.

As depicted, the boom 30 includes a plurality of boom segments 36. Adjacent pairs of the boom segments 36 may be connected to each other by a corresponding joint 38. As depicted, a first boom segment $36_1$ is rotatably attached to the vehicle 20 at a first joint $38_1$. The first boom segment $36_1$ may be mounted by two rotatable joints. For example, the first rotatable joint may include a turntable, and the second rotatable joint may include a horizontal axis. A second boom segment $36_2$ is attached to the first boom segment $36_1$ at a second joint $38_2$. Likewise, a third boom segment $36_3$ is attached to the second boom segment $36_2$ at a joint $38_3$, and a fourth boom segment $36_4$ is attached to the third boom segment $36_3$ at a fourth joint $38_4$. A relative position/orientation between the adjacent pairs of the boom segments 36 may be controlled by a corresponding hydraulic cylinder 110. For example, a relative position/orientation between the first boom segment $36_1$ and the vehicle 20 is controlled by a first hydraulic cylinder $110_1$. The relative position/orientation between the first boom segment $36_1$ and the second boom segment $36_2$ is controlled by a second hydraulic cylinder $110_2$. Likewise, the relative position/orientation between the third boom segment $36_3$ and the second boom segment $36_2$ may be controlled by a third hydraulic cylinder $110_3$, and the relative position/orientation between the fourth boom segment $36_4$ and the third boom segment $36_3$ may be controlled by a fourth hydraulic cylinder $110_4$.

According to the principles of the present disclosure, the boom 30, including the plurality of boom segments $36_{1-4}$, may be modeled and vibration of the boom 30 may be controlled by the controller 640. In particular, the controller 640 may send a signal 652 to the valve 700 and a signal 654 to the valve 800. The signal 652 may include a vibration component $652v$, and the signal 654 may include a vibration component $654v$. The vibration component $652v$, $654v$ may cause the respective valve 700, 800 to produce a vibratory flow and/or a vibratory pressure at the respective port 702, 804. The vibratory flow and/or the vibratory pressure may be transferred through the respective counter-balance valve 300, 400 and to the respective chamber 116, 118 of the hydraulic cylinder 110.

The signals 652, 654 of the controller 640 may also include move signals that cause the hydraulic cylinder 110 to extend and retract, respectively, and thereby actuate the boom 30. As will be further described below, the signals 652, 654 of the controller 640 may also include selection signals that select one of the counter-balance valves 300, 400 as a holding counter-balance valve and select the other of the counter-balance valves 400, 300 as a vibration flow/pressure transferring counter-balance valve. In the depicted embodiment, a loaded one of the chambers 116, 118 of the hydraulic cylinder 110, that is loaded by the net load 90, corresponds to the holding counter-balance valve 300, 400, and an unloaded one of the chambers 118, 116 of the hydraulic cylinder 110, that is not loaded by the net load 90, corresponds to the vibration flow/pressure transferring counter-balance valve 400, 300. In certain embodiments, the vibration component $652v$ or $654v$ may be transmitted to the control valve 800, 700 that corresponds to the unloaded one of the chambers 118, 116 of the hydraulic cylinder 110.

The controller 640 may receive input from various sensors, including the sensors 610, optional remote sensors 620, position sensors, LVDTs, vision base sensors, etc. and thereby compute the signals 652, 654, including the vibration component $652v$, $654v$ and the selection signals. The controller 640 may include a dynamic model of the boom 30 and use the dynamic model and the input from the various sensors to calculate the signals 652, 654, including the vibration component $652v$, $654v$ and the selection signals. In certain embodiments, the selection signals include testing signals to determine the loaded one and/or the unloaded one of the chambers 116, 118 of the hydraulic cylinder 110.

In certain embodiments, a single system such as the hydraulic system 600 may be used on one of the hydraulic cylinders 110 (e.g., the hydraulic cylinder $110_1$). In other embodiments, a plurality of the hydraulic cylinders 110 may each be actuated by a corresponding hydraulic system 600. In still other embodiments, all of the hydraulic cylinders 110 may each be actuated by a system such as the system 600.

Turning now to FIG. 2, certain elements of the hydraulic system 600 will be described in detail. The example hydraulic system 600 includes the proportional hydraulic control valve 700 and the proportional hydraulic control valve 800. In the depicted embodiment, the hydraulic valves 700 and 800 are three-way three position proportional valves. The valves 700 and 800 may be combined within a common valve body. In certain embodiments, some or all of the valves 300, 350, 400, 450, 700, and/or 800 of the hydraulic system 600 may be combined within a common valve body and/or a common valve block. In certain embodiments, some or all of the valves 300, 350, 400, 450, 700, and/or 800 of the valve arrangement 840 may be combined within a common valve body and/or a common valve block. In certain embodiments, the valves 300, 350, and/or 700 of the valve arrangement 840 may be combined within a common valve body and/or a common valve block. In certain embodiments, the valves 400, 450, and/or 800 of the valve arrangement 840 may be combined within a common valve body and/or a common valve block.

The hydraulic valve 700 may include a spool 720 with a first configuration 722, a second configuration 724, and a third configuration 726. As illustrated, the spool 720 is at the third configuration 726. The valve 700 includes a port 702, a port 712, and a port 714. In the first configuration 722, the port 714 is blocked off, and the port 702 is fluidly connected to the port 712. In the second configuration 724, the ports 702, 712, 714 are all blocked off. In the third configuration 726, the port 702 is fluidly connected to the port 714, and the port 712 is blocked off.

The hydraulic valve 800 may include a spool 820 with a first configuration 822, a second configuration 824, and a third configuration 826. As illustrated, the spool 820 is at the third configuration 826. The valve 800 includes a port 804, a port 812, and a port 814. In the first configuration 822, the port 812 is blocked off, and the port 804 is fluidly connected to the port 814. In the second configuration 824, the ports 804, 812, 814 are all blocked off. In the third configuration 826, the port 804 is fluidly connected to the port 812, and the port 814 is blocked off.

In the depicted embodiment, a hydraulic line 562 connects the port 302 of the counter-balance valve 300 with the port 122 of the hydraulic cylinder 110. Node 51 may include the hydraulic line 562. A hydraulic line 564 may connect the port 402 of the counter-balance valve 400 with the port 124 of the hydraulic cylinder 110. Node 52 may include the hydraulic line 564. In certain embodiments, the hydraulic lines 562 and/or 564 are included in valve blocks, housings, etc. and may be short in length. A hydraulic line 552 may connect the port 304 of the counter-balance valve 300 with the port 702 of the hydraulic valve 700 and with the port 462 of the valve 450. Node 53 may include the hydraulic line 552. Likewise, a hydraulic line 554 may connect the port 404 of the counter-balance valve 400 with the port 804 of the hydraulic valve 800 and with the port 362 of the valve 350. Node 54 may include the hydraulic line 554. A hydraulic line (unnumbered) may connect the port 306 of the counter-balance valve 300 with the port 352 of the valve 350, and node 55 may include this hydraulic line. Likewise, a hydraulic line (unnumbered) may connect the port 406 of the counter-balance valve 400 with the port 452 of the valve 450, and node 56 may include this hydraulic line. In other embodiments, the ports 306 and 352 may directly connect to each other. Likewise, the ports 406 and 452 may directly connect to each other.

Figure 3:
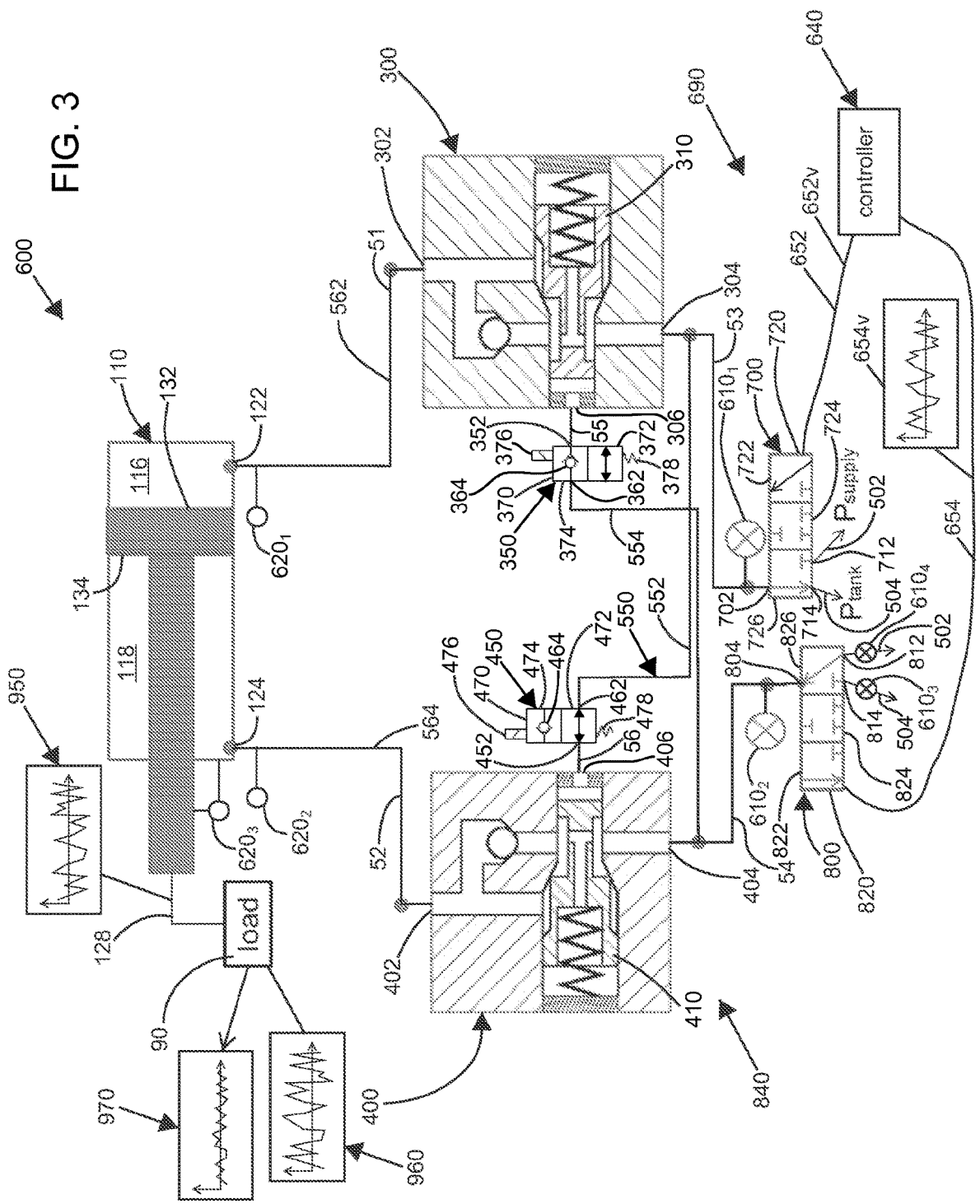
FIG. 3 is the schematic illustration of FIG. 2, but with a valve blocking fluid flow to a pilot of one of the counter-balance valves of FIG. 2.

As illustrated at FIGS. 2 and 3, the valve 350 is a two-way two position valve. In particular, the valve 350 includes the first port 352 and the second port 362. The valve 350 includes a spool 370 with a first configuration 372 and a second configuration 374. In the first configuration 372 (depicted at FIG. 2), the port 352 and the port 362 are fluidly connected. In the second configuration 374 (depicted at FIG. 3), the port 362 and the port 352 are connected with a one-way flow device 364 (e.g., a check valve). As depicted, the valve 350 includes a solenoid 376 and a spring 378. The solenoid 376 and the spring 378 can be used to move the spool 370 between the first configuration 372 and the second configuration 374. As depicted, the valve spool 370 is positioned at the first configuration 372 when the solenoid 376 is unpowered. As depicted, the one-way flow device 364 allows flow from node 55 to node 54 and prevents flow from node 54 to node 55 when the valve spool 370 is positioned at the second configuration 374 (see FIG. 3).

As depicted, the valve 450 is also a two-way two position valve. In particular, the valve 450 includes the first port 452 and the second port 462. The valve 450 includes a spool 470 with a first configuration 472 and a second configuration 474. In the first configuration 472, the port 452 and the port 462 are fluidly connected. In the second configuration 474, the port 462 and the port 452 are connected with a one-way flow device 464 (e.g., a check valve). As depicted, the valve 450 includes a solenoid 476 and a spring 478. The solenoid 476 and the spring 478 can be used to move the spool 470 between the first configuration 472 and the second configuration 474. As depicted, the valve spool 470 is positioned at the first configuration 472 when the solenoid 476 is unpowered. As depicted, the one-way flow device 464 allows flow from node 56 to node 53 and prevents flow from node 53 to node 56 when the valve spool 470 is positioned at the second configuration 474.

When the valves 350 and 450 are both positioned at the first configurations 372 and 472 (see FIG. 2), respectively, the hydraulic system 600 may function the same as or similar to the conventional hydraulic system 100, described above. The hydraulic system 600 may include a "conventional" mode that configures the valves 350 and 450 at the first configurations 372, 472. The "conventional" mode may disable and/or deactivate the vibration control features of the hydraulic system 600. The "conventional" mode may be selected by a machine operator and/or may be selected automatically (e.g., by the controller 640). Manual or automatic selection of the "conventional" mode may be implemented by the controller 640 (e.g., by sending electrical signals to the solenoids 376 and/or 476). As depicted, a lack of power at the solenoids 376, 476 corresponds with the selection of the "conventional" mode. In other embodiments, providing power to the solenoids 376 and/or 476 corresponds with the selection of the "conventional" mode (e.g., configures the valves 350 and/or 450 at the first configurations 372 and/or 472). In certain embodiments, the valve spools 370 and/or 470 may be manually positioned (e.g., by a linkage). In certain embodiments, the valve spools 370 and/or 470 may be positioned by pilot hydraulic pressure. In certain embodiments, the "conventional" mode may be selected when cylinder movements of the hydraulic cylinder 110 are executed (e.g., when a position configuration change of the boom 30 is executed).

When the vibration control features of the hydraulic system 600 are executed, one of the valves 350 and 450 may be positioned at the second configuration 372, 472. For example, as depicted at FIG. 3, the chamber 116 of the hydraulic cylinder 110 is the load holding and/or drift preventing chamber, and the vibratory flow and/or the vibratory pressure is applied to the chamber 118 of the hydraulic cylinder 110. The vibratory flow and/or the vibratory pressure may be generated by the control valve 800 in response to the signal 654v from the controller 640. A pilot opening pressure (e.g., generated by the control valve 700) may be applied to the counter-balance valve 400 thereby allowing the vibratory flow and/or the vibratory pressure generated by the control valve 800 to bi-directionally pass through the counter-balance valve 400 to the chamber 118. The vibratory flow and/or the vibratory pressure thereby act on nodes 52 and 54 of the hydraulic system 600. With the valve 350 at the second configuration 374, the vibratory flow and/or the vibratory pressure is blocked from reaching node 55 of the hydraulic system 600 by the one-way flow device 364 of the valve 350, and the counter-balance valve 300 is not opened by the vibratory flow and/or the vibratory pressure, even if a pilot opening pressure of the counter-balance valve 300 is exceeded at node 54.

The counter-balance valve 300 may develop/exhibit internal fluid leakage under certain conditions and/or in certain embodiments. For example, the internal fluid leakage may transfer hydraulic fluid from node 51 to node 55 and/or may transfer hydraulic fluid from node 53 to node 55. If such internal fluid leakage occurs and is not allowed to drain, pressure may develop at node 55. If the pressure at node 55 exceeds the pilot opening pressure of the counter-balance valve 300, the spool 310 may be actuated by the pressure at node 55, and the counter-balance valve 300 may open. However, the one-way flow device 364 of the valve 350 allows node 55 to drain to node 54. In particular, the vibratory flow and/or the vibratory pressure may be generated so that at least periodically the pressure at node 54 is below the pilot opening pressure of the counter-balance valve 300. Thus, the one-way flow device 364 of the valve 350 allows node 55 to drain to node 54 when the pressure at node 54 is below the pilot opening pressure of the counter-balance valve 300, and the pressure at node 55 may remain below the pilot opening pressure of the counter-balance valve 300 in this configuration of the hydraulic system 600.

In another example, the chamber 118 of the hydraulic cylinder 110 is the load holding and/or drift preventing chamber, and the vibratory flow and/or the vibratory pressure is applied to the chamber 116 of the hydraulic cylinder 110. The vibratory flow and/or the vibratory pressure may be generated by the control valve 700 in response to the signal 652v from the controller 640. A pilot opening pressure (e.g., generated by the control valve 800) may be applied to the counter-balance valve 300 thereby allowing the vibratory flow and/or the vibratory pressure generated by the control valve 700 to bi-directionally pass through the counter-balance valve 300 to the chamber 116. The vibratory flow and/or the vibratory pressure thereby act on nodes 51 and 53 of the hydraulic system 600. With the valve 450 at the second configuration 474, the vibratory flow and/or the vibratory pressure is blocked from reaching node 56 of the hydraulic system 600 by the one-way flow device 464 of the valve 450, and the counter-balance valve 400 is not opened by the vibratory flow and/or the vibratory pressure, even if a pilot opening pressure of the counter-balance valve 400 is exceeded at node 53.

The counter-balance valve 400 may develop/exhibit internal fluid leakage under certain conditions and/or in certain embodiments. For example, the internal fluid leakage may transfer hydraulic fluid from node 52 to node 56 and/or may transfer hydraulic fluid from node 54 to node 56. If such internal fluid leakage occurs and is not allowed to drain, pressure may develop at node 56. If the pressure at node 56 exceeds the pilot opening pressure of the counter-balance valve 400, the spool 410 may be actuated by the pressure at node 56, and the counter-balance valve 400 may open. However, the one-way flow device 464 of the valve 450 allows node 56 to drain to node 53. In particular, the vibratory flow and/or the vibratory pressure may be generated so that at least periodically the pressure at node 53 is below the pilot opening pressure of the counter-balance valve 400. Thus, the one-way flow device 464 of the valve 450 allows node 56 to drain to node 53 when the pressure at node 53 is below the pilot opening pressure of the counter-balance valve 400, and the pressure at node 56 may remain below the pilot opening pressure of the counter-balance valve 400 in this configuration of the hydraulic system 600.

In other embodiments, other methods of draining nodes 55 and/or 56 may be implemented.

In certain applications, the hydraulic actuator (e.g., the hydraulic cylinder 110) may always be or may predominantly be loaded in a same direction when the vibration control features (e.g., of the hydraulic system 600) are desired. For example, the hydraulic cylinder $110_1$ of the boom 30 may always be or may predominantly be loaded in compression, and the chamber 116 of the hydraulic cylinder $110_1$ may always be or may predominantly be the load holding and/or drift preventing chamber when the vibration control features are desired. In such applications, one of the valves 350 or 450 may be removed from the hydraulic system 600. For example, if the chamber 116 of the hydraulic cylinder 110 is always or is predominantly the load holding and/or drift preventing chamber, the valve 450 may be removed and nodes 53 and 56 may be combined. As another example, if the chamber 118 of the hydraulic cylinder 110 is always or is predominantly the load holding and/or drift preventing chamber, the valve 350 may be removed and nodes 54 and 55 may be combined.

Figure 6:
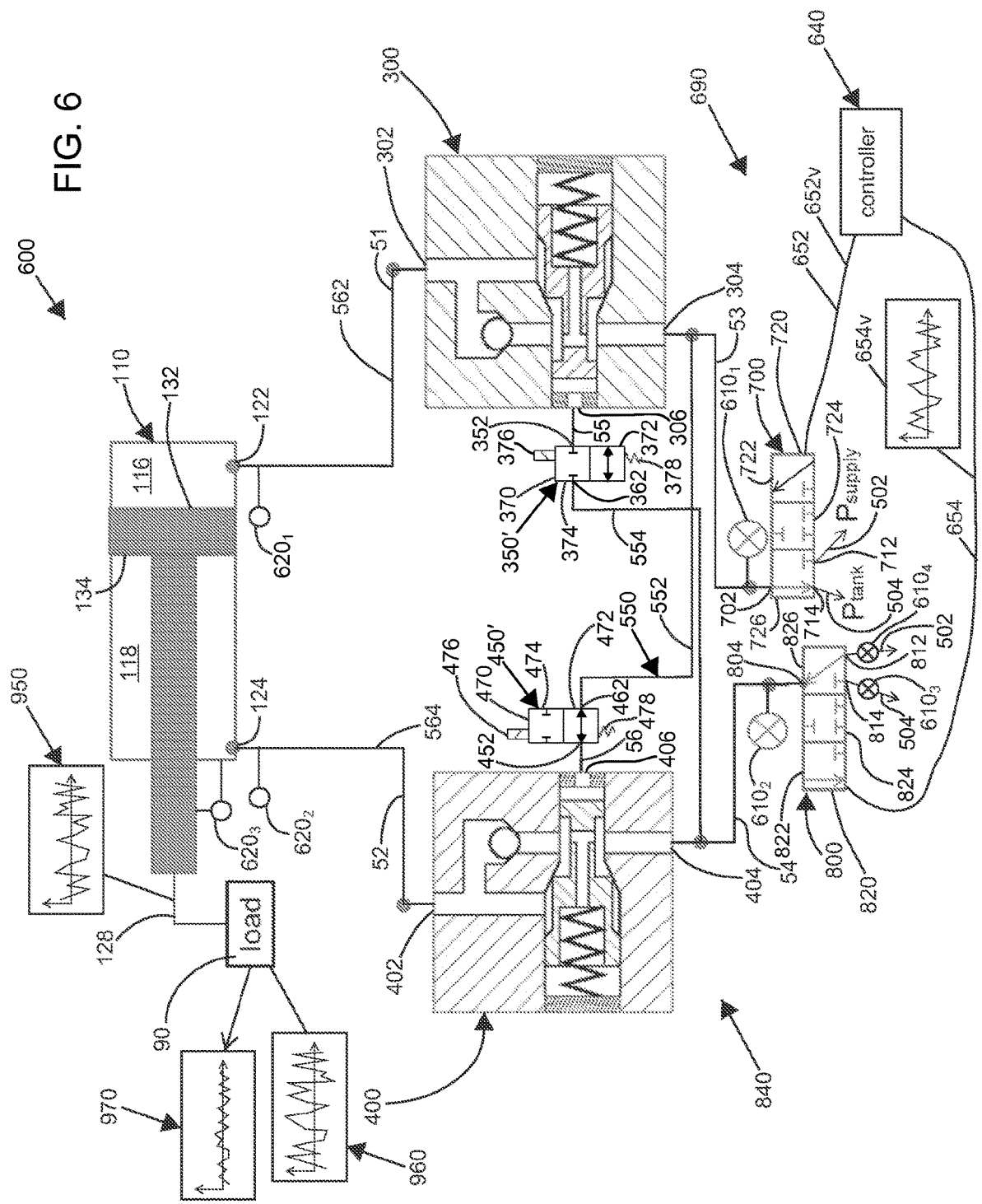
FIG. 6 is the schematic illustration of FIG. 3, but with valves blocking fluid flow to pilots of the counter-balance valves replaced with bi-directional on-off valves.

In certain embodiments and/or in certain configurations, the internal leakage of the counter-balance valves 300 and/or 400 may be zero or negligible. In such embodiments, the valves 350 and/or 450 may be replaced by valves 350' and/or 450', respectively (see FIG. 6). The valves 350', 450' may be generally the same as or similar to the valves 350, 450 but have the one-way flow device 364, 464 removed. The valve 350' instead blocks flow between the ports 352 and 362 in both directions when at the second configuration 374. Likewise, the valve 450' blocks flow between the ports 452 and 462 in both directions when at the second configuration 474.

The valve 350, 350' allows the vibratory flow and/or the vibratory pressure generated by the control valve 800 to exceed the pilot opening pressure of the counter-balance valve 300 without opening the counter-balance valve 300. Likewise, the valve 450, 450' allows the vibratory flow and/or the vibratory pressure generated by the control valve 700 to exceed the pilot opening pressure of the counter-balance valve 400 without opening the counter-balance valve 400. Thus, the valves 350, 350' and 450, 450' allow the vibratory flow and/or the vibratory pressure to reach pressures limited by the supply pressure, and a vibratory response force/displacement 950 can be correspondingly aggressive.

In certain environments, the vibratory response force/displacement 950 may be suitable at pressures below the pilot opening pressure of the counter-balance valve 300, 400. In such or similar embodiments and/or environments, the valves 350, 350', 450, 450' may remain at the first configuration 372, 472, and/or the hydraulic system 600 may be operated the same as or similar to a hydraulic system 600 of U.S. patent application Ser. No. 61/872,424, filed on Aug. 30, 2013, entitled Control Method and System for Using a Pair of Independent Hydraulic Metering Valves to Reduce Boom Oscillations, which is hereby incorporated by reference in its entirety.

Sensors that measure temperature and/or pressure at various ports of the valves 700, 800 and/or at other locations may be provided. In particular, a sensor $610_1$ is provided adjacent the port 702 of the valve 700. As depicted, the sensor $610_1$ is a pressure sensor and may be used to provide dynamic information about the system 600 and/or the boom system 10. As depicted at FIGS. 2 and 3, a second sensor $610_2$ is provided adjacent the port 804 of the hydraulic valve 800. The sensor $610_2$ may be a pressure sensor and may be used to provide dynamic information about the hydraulic system 600 and/or the boom system 10. As further depicted at FIGS. 2 and 3, a third sensor $610_3$ may be provided adjacent the port 814 of the valve 800, and a fourth sensor $610_4$ may be provided adjacent the port 812 of the valve 800. The sensors $610_3$ and $610_4$ may also be used to provide dynamic information about the hydraulic system 600 and/or the boom system 10. A sensor $620_1$ may be a pressure sensor provided adjacent the port 122 of the chamber 116 of the hydraulic cylinder 110, and a sensor $620_2$ may be a pressure sensor provided adjacent the port 124 of the chamber 118 of the hydraulic cylinder 110. In certain embodiments, a sensor $620_3$ may be capable of measuring relative position, velocity, and/or acceleration of the rod 126 relative to the head side 112 and/or housing of the hydraulic cylinder 110. In certain embodiments, a sensor capable of measuring relative position, velocity, and/or acceleration of the rod 126 relative to the head side 112 and/or housing of the hydraulic cylinder 110 is not used. The sensors 620 may also be used to provide dynamic information about the hydraulic system 600 and/or the boom system 10. The sensors 610 and 620 may provide feedback signals to the controller 640.

In certain embodiments, pressure within the supply line 502 and/or pressure within the tank line 504 are well known, and the pressure sensors $610_1$ and $610_2$ may be used to calculate flow rates through the valves 700 and 800, respectively. In other embodiments, a pressure difference across the valve 700, 800 is calculated. For example, the pressure sensor $610_3$ and the pressure sensor $610_2$ may be used when the spool 820 of the valve 800 is at the first position 822 and thereby calculate flow through the valve 800. Likewise, a pressure difference may be calculated between the sensor $610_2$ and the sensor $610_4$ when the spool 820 of the valve 800 is at the third configuration 826. The controller 640 may use these pressures and pressure differences as control inputs.

Temperature sensors may further be provided at and around the valves 700, 800 and thereby refine the flow measurements by allowing calculation of the viscosity and/or density of the hydraulic fluid flowing through the valves 700, 800. The controller 640 may use these temperatures as control inputs.

Although depicted with the first sensor $610_1$, the second sensor $610_2$, the third sensor $610_3$, and the fourth sensor $610_4$, fewer sensors or more sensors than those illustrated may be used in alternative embodiments. Further, such sensors may be positioned at various other locations in other embodiments. In certain embodiments, the sensors 610 may be positioned within a common valve body. In certain embodiments, an Ultronics® servo valve available from Eaton Corporation may be used. The Ultronics® servo valve provides a compact and high performance valve package that includes two three-way valves (i.e., the valves 700 and 800), the pressure sensors 610, and a pressure regulation controller (e.g., included in the controller 640). The Ultronics® servo valve may serve as the valve assembly 690. The Eaton Ultronics® servo valve further includes linear variable differential transformers (LVDT) that monitor positions of the spools 720, 820, respectively. By using the two three-way proportional valves 700, 800, the pressures of the chambers 116 and 118 may be independently controlled. In addition, the flow rates into and/or out of the chambers 116 and 118 may be independently controlled. In other embodiments, the pressure of one of the chambers 116, 118 may be independently controlled with respect to a flow rate into and/or out of the opposite chambers 116, 118.

In comparison with using a single four-way proportional valve 200 (see FIG. 1), the configuration of the hydraulic system 600 can achieve and accommodate more flexible control strategies with less energy consumption. For example, when the cylinder 110 is moving, the valve 700, 800 connected with the metered-out chamber 116, 118 can manipulate the chamber pressure while the valves 800, 700 connected with the metered-in chamber can regulate the flow entering the chamber 118, 116. As the metered-out chamber pressure is not coupled with the metered-in chamber flow, the metered-out chamber pressure can be regulated to be low and thereby reduce associated throttling losses.

The supply line 502, the return line 504, the hydraulic line 552, the hydraulic line 554, the hydraulic line 562, the hydraulic line 564, a hydraulic line extending between the ports 306 and 352, and/or a hydraulic line extending between the ports 406 and 452 may belong to a line set 550.

Upon vibration control being deactivated (e.g., by an operator input), the hydraulic system 600 may configure the valve arrangement 840 as a conventional counter-balance/control valve arrangement. The conventional counter-balance/control valve arrangement may be engaged when moving the boom 30 under move commands to the control valves 700, 800.

Upon vibration control being activated (e.g., by an operator input), the valve arrangement 840 may effectively lock the hydraulic cylinder 110 from moving. In particular, the activated configuration of the valve arrangement 840 may lock one of the chambers 116, 118 of the hydraulic cylinder 110 while sending vibratory pressure and/or flow to an opposite one of the chambers 118, 116. The vibratory pressure and/or flow may be used to counteract external vibrations 960 encountered by the boom 30.

Turning now to FIGS. 2 and 3, certain components of the counter-balance valve 300, 400 will be described in detail. The counter-balance valve 300, 400 includes a first port 302, 402, a second port 304, 404, and a third port 306, 406, respectively. As depicted, the port 302, 402 is fluidly connected to a hydraulic component (e.g., the hydraulic cylinder 110). The port 304, 404 is fluidly connected to a control valve (e.g., the control valve 700, 800). The port 306, 406 is a pilot port that is selectively fluidly connected to the port 404, 304 of an opposite counter-balance valve via the valve 350, 450. By selectively connecting the port 306, 406 to the port 404, 304 of the opposite counter-balance valve, the port 306, 406 is also selectively fluidly connected to a control valve 800, 700 that is opposite the control valve 700, 800 that is connected to the port 304, 404.

The spool 310, 410 is movable within a bore of the counter-balance valve 300, 400. In particular, a net force on the spool 310, 410 moves or urges the spool 310, 410 to move within the bore. The spool 310, 410 includes a spring area and an opposite pilot area. The spring area is operated on by a pressure at the port 304, 404. Likewise, the pilot area is operated on by a pressure at the port 306, 406. In certain embodiments, a pressure at the port 302, 402 may have negligible or minor effects on applying a force that urges movement on the spool 310, 410. In other embodiments, the spool 310, 410 may further include features that adapt the counter-balance valve 300, 400 to provide a relief valve function responsive to a pressure at the port 302, 402. In addition to forces generated by fluid pressure acting on the spring and pilot areas, the spool 310, 410 is further operated on by a spring force. In the absence of pressure at the ports 304, 404 and 306, 406, the spring force urges the spool 310, 410 to seat and thereby prevent fluid flow between the ports 302, 402 and 304, 404. As illustrated at FIG. 1, a passage 322, 422 and check valves 320, 420 allow fluid to flow from the port 304, 404 to the port 302, 402 by bypassing the seated spool 310, 410. However, flow from the port 302, 402 to the port 304, 404 is prevented by the check valve 320, 420, when the spool 310, 410 is seated.

A net load direction on the hydraulic cylinder 110 can be determined by comparing the pressure measured by the sensor $620_1$ multiplied by the effective area of the chamber 116 and comparing with the pressure measured by the sensor $620_2$ multiplied by the effective area of the chamber 118.

If the net load 90 is supported by the chamber 116, the control valve 700 may supply the pilot opening pressure to the port 406 via the valve 450, and the control valve 800 may supply a vibration canceling fluid flow to the chamber 118. The sensors $610_1$ and/or $610_2$ can be used to detect the frequency, phase, and/or amplitude of any external vibrational inputs to the hydraulic cylinder 110. Alternatively or additionally, vibrational inputs to the hydraulic cylinder 110 may be measured by an upstream pressure sensor (e.g., the sensors $620_1$ and/or $620_2$), an external position sensor (e.g., the sensors $620_3$), an external acceleration sensor (e.g., the sensors $620_3$), and/or various other sensors. If the net load 90 is supported by the chamber 118, the control valve 800 may supply a pilot opening pressure to the port 306 via the valve 350, and the control valve 700 may supply a vibration canceling fluid flow to the chamber 116. The sensors $610_1$ and/or $610_2$ can be used to detect the frequency, phase, and/or amplitude of any external vibrational inputs to the hydraulic cylinder 110. Alternatively or additionally, vibrational inputs to the hydraulic cylinder 110 may be measured by an upstream pressure sensor (e.g., the sensors $620_1$ and/or $620_2$), an external position sensor (e.g., the sensors $620_3$), an external acceleration sensor (e.g., the sensors $620_3$), and/or various other sensors.

The vibration cancellation algorithm can take different forms. In certain embodiments, the frequency and phase of the external vibration may 960 be identified by a filtering algorithm (e.g., by Least Mean Squares, Fast Fourier Transform, etc.). In certain embodiments, the frequency, the amplitude, and/or the phase of the external vibration may be identified by various conventional means. In certain embodiments, upon identifying the frequency, the amplitude, and/or the phase of the external vibration, a pressure signal with the same frequency and appropriate phase shift may be applied at the unloaded chamber 116, 118 to cancel out the disturbance caused by the external vibration 960. The control valves 700 and/or 800 may be used along with the controller 640 to continuously monitor flow through the control valves 700 and/or 800 to ensure no unexpected movements occur.

In the depicted embodiments, the sensors $610_1$ and $610_2$ are shielded from measuring the pressures at the ports 122 and 124 of the hydraulic cylinder 110, respectively, by the counter-balance valves 300 and 400. Therefore, methods independent of the sensors $610_1$ and $610_2$ can be used to determine the direction of the net load 90 on the cylinder 110 and to determine external vibrations acting on the cylinder 110. In certain embodiments, pressure sensors (e.g., the pressure sensors $620_1$ and $620_2$) at the ports 122 and/or 124 may be used. In other embodiments, the pressure sensors $610_1$ and $610_2$ may be used. Alternatively or additionally, other sensors such as accelerometers, position sensors, visual tracking of the boom 30, etc. may be used (e.g., a position, velocity, and/or acceleration sensor $610_3$ that tracks movement of the rod 126 of the hydraulic cylinder 110).

The valve arrangement 840 may be configured to apply an anti-vibration (i.e., a vibration cancelling) response as follows. If the net load 90 is determined to be held by the chamber 116, the control valve 700 pressurizes node 53 thereby opening the counter-balance valve 400 and further urging the counter-balance valve 300 to close. Upon the counter-balance valve 400 being opened, the control valve 800 may apply an anti-vibration fluid pressure/flow to the chamber 118. The controller 640 may position the valve 350 to the second configuration 374 (see FIG. 3) to preclude opening the counter-balance valve 300. If the net load 90 is determined to be held by the chamber 118, the control valve 800 pressurizes node 54 thereby opening the counter-balance valve 300 and further urging the counter-balance valve 400 to close. Upon the counter-balance valve 300 being opened, the control valve 700 may apply an anti-vibration fluid pressure/flow to the chamber 116. The controller 640 may position the valve 450 to the second configuration 474 to preclude opening the counter-balance valve 400.

In embodiments where the direction of the net cylinder load 90 is independently known to be acting on the chamber 116 but at least some of the parameters of the external vibration acting on the hydraulic cylinder 110 are unknown from external sensor information, the pressure sensor $610_2$ may be used to measure pressure fluctuations within the chamber 118 and thereby determine characteristics of the external vibration. If the direction of the net cylinder load is independently known to be acting on the chamber 118 but at least some of the parameters of the external vibration acting on the hydraulic cylinder 110 are unknown from external sensor information, the pressure sensor $610_1$ may be used to measure pressure fluctuations within the chamber 116 and thereby determine characteristics of the external vibration.

As schematically illustrated at FIG. 2, an environmental vibration load 960 is imposed as a component of the net load 90 on the hydraulic cylinder 110. As depicted at FIG. 2, the vibration load component 960 does not include a steady state load component. In certain applications, the vibration load 960 includes dynamic loads such as wind loads, momentum loads of material that may be moved along the boom 30, inertial loads from moving the vehicle 20, and/or other dynamic loads. The steady state load may include gravity loads that may vary depending on the configuration of the boom 30. The vibration load 960 may be sensed and estimated/measured by the various sensors 610, 620 and/or other sensors. The controller 640 may process these inputs and use a model of the dynamic behavior of the boom system 10 and thereby calculate and transmit an appropriate vibration signal $652v$, $654v$. The signal $652v$, $654v$ is transformed into hydraulic pressure and/or hydraulic flow at the corresponding valve 700, 800. The vibratory pressure/flow is transferred through the corresponding counter-balance valve 300, 400 and to the corresponding chamber 116, 118 of the hydraulic cylinder 110. The hydraulic cylinder 110 transforms the vibratory pressure and/or the vibratory flow into the vibratory response force/displacement 950. When the vibratory response 950 and the vibration load 960 are superimposed on the boom 30, a resultant vibration 970 is produced. The resultant vibration 970 may be substantially less than a vibration of the boom 30 generated without the vibratory response 950. Vibration of the boom 30 may thereby be controlled and/or reduced enhancing the performance, durability, safety, usability, etc. of the boom system 10. The vibratory response 950 of the hydraulic cylinder 110 is depicted at FIG. 2 as a dynamic component of the output of the hydraulic cylinder 110. The hydraulic cylinder 110 may also include a steady state component (i.e., a static component) that may reflect static loads such as gravity.

According to the principles of the present disclosure, a control method uses independent metering main control valves 700, 800 with embedded sensors 610 (e.g., embedded pressure sensors) that can sense oscillating pressure and provide a ripple cancelling pressure with counter-balance valves 300, 400 (CBVs) installed. The approach calls for locking one side (e.g., one chamber 116 or 118) of the actuator 110 in place to prevent drifting of the actuator 110. According to the principles of the present disclosure, active ripple cancelling is provided, an efficiency penalty of orifices is avoided, and/or the main control valves 700, 800 may be the only control elements. According to the principles of the present disclosure, embedded pressure sensors 610 embedded in the valve 700, 800 and/or external pressure/acceleration/position sensors 620 may be used.

This application relates to US Provisional Patent Application Ser. No. 61/829,796, filed on May 31, 2013, entitled Hydraulic System and Method for Reducing Boom Bounce with Counter-Balance Protection, and Ser. No. 61/872,424, filed on Aug. 30, 2013, entitled Control Method and System for Using a Pair of Independent Hydraulic Metering Valves to Reduce Boom Oscillations, which are hereby incorporated by reference in their entireties.

Various modifications and alterations of this disclosure will become apparent to those skilled in the art without departing from the scope and spirit of this disclosure, and it should be understood that the scope of this disclosure is not to be unduly limited to the illustrative embodiments set forth herein.

What is claimed is:

1. A hydraulic system comprising:
   a hydraulic actuator including a first chamber and a second chamber;
   a first counter-balance valve fluidly connected to the first chamber;
   a second counter-balance valve fluidly connected to the second chamber;
   a first control valve fluidly connected to the first counter-balance valve;
   a second control valve fluidly connected to the second counter-balance valve at a; and
   a first valve fluidly connected to a pilot of the first counter-balance valve and fluidly connected to the second counter-balance valve and the second control valve
   wherein the first valve includes a first configuration and a second configuration, wherein the first configuration allows fluid flow between the first valve and the second control valve and between the first valve and the second counter-balance valve, and wherein the second configuration blocks fluid flow from the second control valve and from the second counter-balance valve to the first valve and allows fluid flow from the first valve to the second control valve and to the second counter-balance valve.

2. The hydraulic system of claim 1, further comprising a second valve fluidly connected to a pilot of the second counter-balance valve and fluidly connected to the first counter-balance valve and the first control valve.

3. The hydraulic system of claim 1, wherein the first chamber is a rod chamber and the second chamber is a head chamber.

4. The hydraulic system of claim 1, wherein the first chamber is a head chamber and the second chamber is a rod chamber.

5. The hydraulic system of claim 1, wherein the first counter-balance valve and the second counter-balance valve are physically mounted to the hydraulic actuator.

6. The hydraulic system of claim 1, wherein the first valve is a two-way valve including a first passage allowing bi-directional flow when the two-way valve is at the first configuration and further including a second passage with a check valve when the two-way valve is at the second configuration.

7. The hydraulic system of claim 1, wherein the hydraulic system is adapted to support a net load with the first chamber of the hydraulic actuator and wherein the hydraulic system is further adapted to produce a vibratory response by transmitting a fluctuating pressure to the second chamber of the hydraulic actuator.

8. The hydraulic system of claim 7, wherein the first counter-balance valve blocks fluid flow from the first chamber of the hydraulic actuator and thereby supports the net load when vibration control is active, wherein the first control valve opens bi-directional flow through the second counter-balance valve by pressurizing a pilot of the second counter-balance valve when the vibration control is active, wherein the second counter-balance valve transfers the fluctuating pressure between the second control valve and the second chamber of the hydraulic actuator when the vibration control is active, and wherein the first valve blocks the fluctuating pressure from the pilot of the first counter-balance valve and thereby prevents opening of the first counter-balance valve when the vibration control is active.

9. The hydraulic system of claim 8, wherein the hydraulic system is adapted to drain leakage from the pilot of the first counter-balance valve and thereby prevent pilot pressure from exceeding an opening pressure and opening the first counter-balance valve when the vibration control is active.

10. The hydraulic system of claim 9, wherein a check valve of the first valve is adapted to drain the leakage at least when the fluctuating pressure is below a low pressure and wherein the check valve blocks fluid flow when the vibration control is active.

11. The hydraulic system of claim 1, wherein when vibration control is not active, the first counter-balance valve and the second counter-balance valve are adapted to provide the hydraulic actuator with conventional counter-balance valve protection.

12. The hydraulic system of claim 1, wherein the second control valve includes a pressure sensor adapted to measure a vibration load applied to the hydraulic actuator.

13. The hydraulic system of claim 1, wherein the hydraulic actuator is a linear hydraulic actuator.

14. The hydraulic system of claim 1, wherein the hydraulic actuator is a hydraulic cylinder.

15. The hydraulic system of claim 1, wherein the hydraulic actuator is a rotary hydraulic actuator.

* * * * *